May 5, 1964 J. LECUT 3,132,250
APPARATUS FOR DRIVING AND CONTROLLING THE
MOVEMENT OF AN X-RAY TUBE
Filed Sept. 16, 1960
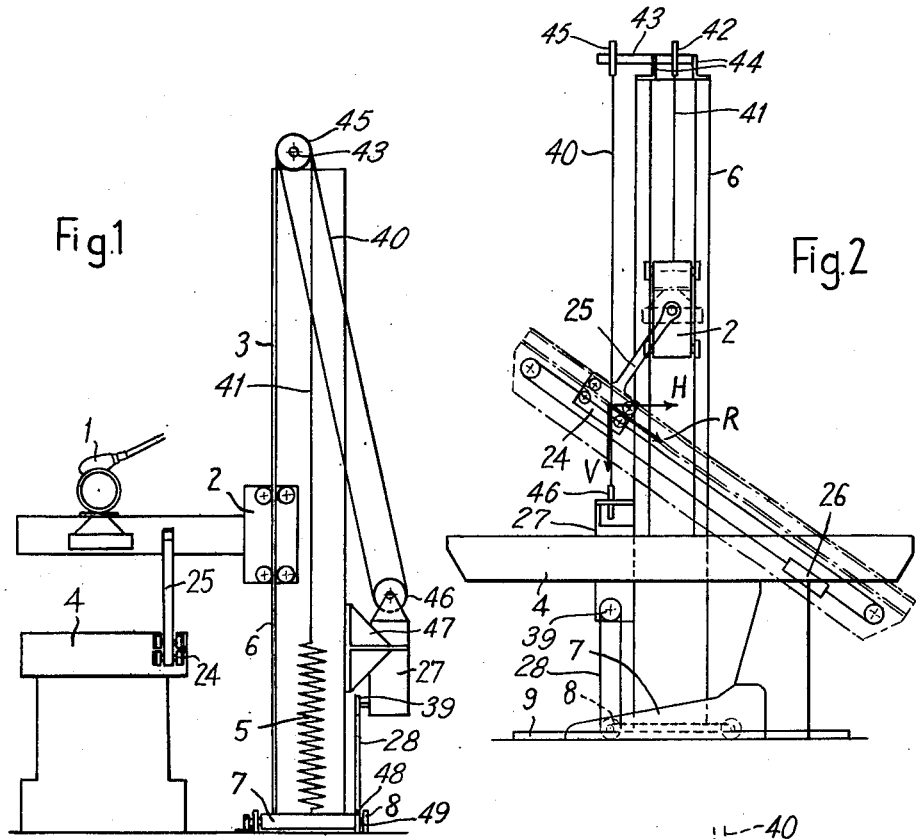
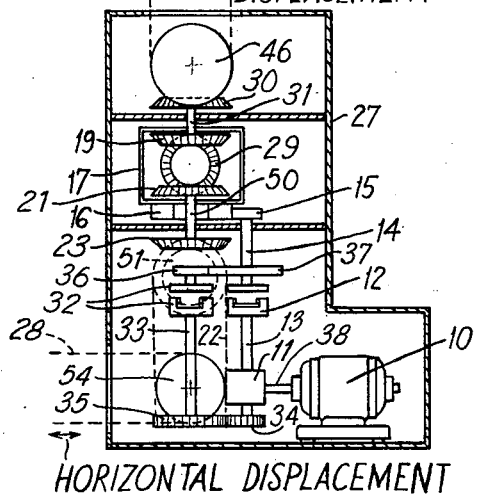
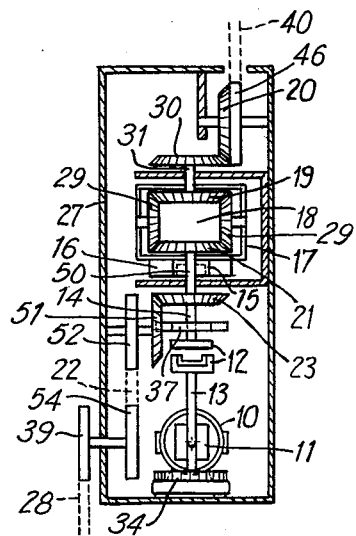
Inventor
Jacques Lecut
By
Stone & Mack
Attorneys

United States Patent Office 3,132,250
Patented May 5, 1964

3,132,250
APPARATUS FOR DRIVING AND CONTROLLING THE MOVEMENT OF AN X-RAY TUBE
Jacques Lecut, Bry-sur-Marne, France, assignor to Compagnie Generale de Radiologie, Paris, France, a French body corporate
Filed Sept. 16, 1960, Ser. No. 56,511
Claims priority, application France Sept. 23, 1959
5 Claims. (Cl. 250—91)

The present invention relates to apparatus for driving and controlling the displacement of an X-ray tube. The increasing complexity of X-ray examinations requires the provision of radiological installations equipped with tubes which are easily displaced or oriented with respect to the examination surface. This is particularly the case in examinations where the tube and the screen are displaced integrally along two homothetic trajectories with respect to a fixed point of the examination surface. These examinations must be able to be made whatever the position of the examination surface, e.g. vertical, oblique or horizontal. To this end it is desirable that these displacements be caused by an appropriate driving force allowing simple manoeuvres which are not tiring for the user at constant and easily reproduced speeds.

In certain known cases, the driving force is applied to the examination surface itself. The tube and the tube-carrying pillar are driven through the intermediary of an arm.

As a consequence of the geometry of the radiological equipment any displacement of the tube-carrying pillar produces torsional forces on the different parts of the device and causes undesirable vibrations particularly in tomography.

According to the present invention these disadvantages are avoided by applying the driving force in the area of the centre of gravity of the radiological equipment, in such a manner as to be able to communicate to the tube a predetermined movement at a controllable speed with respect to the examination surface. This movement can be translational, rotational, or any other type. In accordance with a characteristics of the invention the driving force, produced, for example by an electric motor or through a hydraulic drive, drives two devices through the intermediary of a differential gear, one of which effects horizontal displacement of the whole of the pillar and the other a vertical displacement of the tube on the pillar. A connecting arm between the tube and the examination surface controls the desired resultant movement.

In accordance with known differential action, if the resistance to advancement in one direction is equal to that in the other direction, the horizontal and vertical speeds will be equal, and the tube will be displaced at 45° to the horizontal. However, if the resistance to horizontal advancement increases, the horizontal speed will be decreased and the vertical speed will be increased. Thus, although the sum of the speeds remains constant, the individual speeds and the resultant direction of movement will change.

An embodiment in accordance with invention will now be described with reference to the accompanying drawings, in which:

FIGURES 1 and 2 are respectively a side view and a plan view of X-ray apparatus, according to the invention, and FIGURES 3 and 4, are respectively a side view and an end view of an electro-magnetic driving mechanism.

The complete structure of the apparatus in FIGURES 1 and 2 comprises a generator of X-rays 1, supported by a first carriage 2 which can be vertically displaced by a first driving mechanism along a track 3, formed in a vertical support tube 6, to any height whatsoever from a tiltable examination surface 4.

The first driving mechanism includes a chain 41, connected at one end to the carriage 2, passing over a sprocket 42, fixed to a cross shaft 43, mounted in bearing brackets 44 on top of the tube 6. This assembly is preferably balanced for example by a spring 5, located within the tube 6 and connected to the other end of the chain 41. The mechanism also includes a sprocket 45, fixed to the cross shaft 43, and coupled by a chain 40 to a drive sprocket 46, carried by a casing 27 secured by a bracket 47 to the tube 6. It will be seen that rotation of the sprocket 46 effects vertical displacement of the carriage 2.

The tube 6 is rigidly mounted on a carriage 7 provided with wheels 8 allowing it to be displaced horizontally on another track 9. This displacement is effected by a second driving mechanism including sprockets 39, 48 and chain 28, and the axle 49 on which the wheels 8 are fixed.

As is shown in FIGURES 3 and 4, the drive is effected by an electric motor 10, although this could equally be replaced by a hydraulic or pneumatic motor. Output shaft 38 of motor 10 drives a reducing unit 11, and the output shaft 13 of this unit 11 is arranged either to drive a shaft 14 directly through a disengageable coupling 12, or indirectly, at reduced speed, through reduction gears, 34, 35 shaft 33, disengageable coupling 32 and further reduction gears 36, 37. On the shaft 14 is keyed a pinion 15 which drives a gear 16 fixed to the cage 17 of the differential unit indicated generally at 18. This unit 18 is of conventional design in that it includes a pair of opposed idler or planetary conical bevel gears 29, carried by the cage 17 which mesh with and rotate around a pair of output or sun conical bevel gears 19, 21. The sun gear 19 is connected by its output shaft 31, to a further conical bevel gear 30 meshing with bevel gear 20 driving the sprocket 46 which, as previously stated, effects vertical displacement of the carriage 2. For the sake of clarity, the axis of rotation of the gear 30 and sprocket 46 is shown in FIGURES 3 and 4 as oriented through 90°.

The other sun gear 21 is connected by its output shaft 50, which is rotatable relative to the cage 17 and gear 16, to a conical bevel gear 23 meshing with gear 51, which drives a sprocket 52. The sprocket 52 is coupled by a chain 22 to a sprocket 54 which in turn drives the output sprocket 39 to effect, through chain 28, horizontal displacement of the carriage 7.

As long as the couples to be transmitted to the carriages 2 and 7 by the sun gears 19 and 21 respectively are equal, the vertical and horizontal displacements will be identical. It will be sufficient, in order to alter the speed of one or the other carriages, to introduce a slight unbalance into the forces. For this purpose, and to produce a slowing down or speeding up, there is arranged on or at the side of the examination surface 4 a carriage 24 for the movable control in the longitudinal direction of the examination surface. With the purpose of not introducing too large a variation into the operation of the system, according as to whether the examination surface is in a horizontal, vertical or inclined position, this carriage is fitted with a counter-weight balance 26. A rod 25 connects the carriage 2 to the carriage 24, and it is this which introduces the necessary unbalance into the variations of the speeds H and V (see FIGURE 2) in order to obtain the resultant R always parallel to the examination surface. It is necessary to note that one of the speeds H and V could be nil.

This example of displacement is non-limiting and it is conceivable that a displacement along a curve or any other form of movement whatsoever, may be employed, effected by means of a lever, cam or other device.

By making the movements sufficiently slow, the same device can serve for the positioning of the X-ray tube and allows passage from one examination position to another.

I claim:

1. X-ray apparatus comprising a support member, a first carriage mounted for vertical movement up and down the support member, an X-ray tube mounted on the carriage, a tiltable examination surface, a second carriage connected to the examination surface and movable relative thereto, an arm interconnecting the first and second carriages, a first driving mechanism for moving the first carriage vertically up and down the support member, a second driving mechanism for displacing the support member backwards and forwards along a horizontal path, a driving motor and a differential gear driven by the driving motor and connected to drive the first and second driving mechanisms, whereby the relative displacements of said first and second driving mechanisms are made at speeds variable with the driving couples, the variations in said speeds being of contrary sign whilst the sum of the speeds remains constant.

2. In an X-ray apparatus comprising an X-ray tube mounted on a carriage for vertical movement and a tiltable examination surface, a second carriage connected to the examination surface and movable relative thereto, an arm interconnecting the two carriages, a first driving mechanism for moving the first carriage vertically, a second driving mechanism for displacing the X-ray tube along a horizontal path, a driving motor and a differential gear driven by the driving motor and connected to drive the first and second driving mechanisms, whereby the relative displacements of said first and second driving mechanisms are made at speeds variable with the driving couples, the variations in said speeds being of contrary sign whilst the sum of the speeds remains constant.

3. X-ray apparatus comprising a supporting pillar, a first carriage mounted for vertical movement up and down the pillar, an X-ray tube mounted on the carriage, a tiltable examination surface, a second carriage connected to the examination surface and movable relative thereto, an arm interconnecting the first and second carriages, a first driving mechanism for moving the first carriage vertically up and down the pillar, a second driving mechanism for displacing the pillar backwards and forwards along a horizontal path, a driving motor and a differential gear driven by the driving motor and connected to drive the first and second driving mechanisms, whereby the relative displacements of said first and second driving mechanisms are made at speeds variable with the driving couples, the variations in said speeds being of contrary sign whilst the sum of the speeds remains constant.

4. Apparatus as claimed in claim 3, in which the driving motor is connected to the differential gear arrangement through a reducing unit.

5. X-ray apparatus comprising a support member, a first carriage mounted for vertical movement up and down the support member, an X-ray tube mounted on the carriage, a tiltable examination surface, a second carriage connected to the examination surface and movable relative thereto, a counterbalance weight for said second carriage, an arm interconnecting the first and second carriages, a first driving mechanism for moving the first carriage vertically up and down the support member, a second driving mechanism for displacing the support member backwards and forwards along a horizontal path, a driving motor and a differential gear driven by the driving motor and connected to drive the first and second driving mechanisms, whereby the relative displacements of said first and second driving mechanisms are made at speeds variable with the driving couples, the variations in said speeds being of contrary sign whilst the sum of the speeds remains constant.

References Cited in the file of this patent

UNITED STATES PATENTS

| | | |
|---|---|---|
| 2,167,114 | Kieffer | July 25, 1939 |
| 2,235,144 | Colcher | Mar. 18, 1941 |
| 2,490,400 | Berggren | Dec. 6, 1949 |
| 2,491,224 | Stava | Dec. 13, 1949 |
| 2,789,231 | Dumer | Apr. 16, 1957 |
| 2,909,665 | Guenther et al. | Oct. 20, 1959 |

FOREIGN PATENTS

| | | |
|---|---|---|
| 633,007 | Germany | July 17, 1936 |